United States Patent
Markwardt et al.

(10) Patent No.: US 6,422,853 B1
(45) Date of Patent: Jul. 23, 2002

(54) CHAIN DIE ASSEMBLY

(75) Inventors: Klaus Markwardt, Laatzen; Sven Lippardt, Braunschweig; Werner Hesse, Hannover, all of (DE)

(73) Assignee: Klockner Hansel Prozesstechnik GmbH, Hanover (DE)

(*) Notice: Subject to any disclaimer, the term of this patent is extended or adjusted under 35 U.S.C. 154(b) by 0 days.

(21) Appl. No.: 09/551,274

(22) Filed: Apr. 18, 2000

(30) Foreign Application Priority Data

Apr. 24, 1999 (DE) .......................... 199 18 740

(51) Int. Cl.[7] .............................. B29C 43/08
(52) U.S. Cl. .................. 425/235; 425/297; 425/324.1; 425/344; 425/345; 425/451
(58) Field of Search .................. 425/235, 297, 425/328, 324.1, 344, 345, 451

(56) References Cited

U.S. PATENT DOCUMENTS 1,116,408 A * 11/1914 Gaebel .................... 425/235
1,348,081 A * 7/1920 Brach ..................... 425/328
1,967,565 A * 7/1934 Thurlings ................. 425/235
4,253,815 A * 3/1981 Beckers et al. ........... 425/235
5,022,841 A * 6/1991 Rizzi ...................... 425/235

FOREIGN PATENT DOCUMENTS

EP 0 352 233 B1 9/1993

* cited by examiner

Primary Examiner—Tim Heitbrink
Assistant Examiner—Joseph Leyson
(74) Attorney, Agent, or Firm—Thomas, Kayden, Horstemeyer & Risley LLP

(57) ABSTRACT

A chain die assembly for producing candy includes a plurality of first chain links each including a cutting edge, a plurality of second chain links each including a cutting edge and a common longitudinal center plane. A plurality of guiding housings is arranged right and left of the longitudinal center plane, and they each carry at least one die. A plurality of shafts each connects one of the first chain links to one of the second chain links and to the guiding housings. The second chain links each are fixedly connected to at least one of the guiding housings to be free from backlash and to be unrotatable with respect to the guiding housing.

15 Claims, 2 Drawing Sheets

CHAIN DIE ASSEMBLY

CROSS REFERENCE TO RELATED APPLICATIONS

This application claims the benefit of co-pending German Patent Application No. 199 18 740.1-23 entitled "Prägekette zur Herstellung von Bonbons" filed on Apr. 24, 1999.

FIELD OF THE INVENTION

The present invention generally relates to a chain die assembly and to a die apparatus. Such chain die assemblies are used in die apparatuses with which candy is separated from a continuous rope of candy mass to be formed in die chambers. The chain die assembly as a substantial element of the die apparatus may be used for the production of hard candy and chewy candy. It may be also used for the production of filled candy.

BACKGROUND OF THE INVENTION

Chain die assemblies generally include an endless upper chain and an endless lower chain cooperating to form die chambers for the candy to be produced. The die chambers are limited by chain links of the upper chain and by chain links of the lower chain. Additionally, there are dies right and left of a common longitudinal center plane of the chain die assembly and of the die apparatus. The dies also limit the die chambers. The dies are arranged either at the upper chain or at the lower chain. Especially, the dies are only arranged at the upper chain to make it easier to watch their operation and their correct function. The present invention relates to the portion of the chain die assembly carrying the dies. As already described above, this portion may either be the upper chain or the lower chain. Preferably, the present invention relates to the upper chain of the chain die assembly.

A chain die assembly is known from European Patent No. EP 0 352 233 B1. The die apparatus includes a frame at which the endless upper chain and the endless lower chain are driven and guided by horizontally arranged drive shafts and deflecting shafts. The upper chain carrying the dies includes two different kinds of chain links being alternately arranged. The first kind of chain links includes inward cheeks, meaning cheeks being located at a comparatively small distance with respect to the vertical longitudinal center plane of the die apparatus and of the chain die assembly. The other kind of chain links includes outward cheeks having a greater distance between each another, and surrounding the inward cheeks of the corresponding adjacent chain links. Each chain link of both kinds includes a cutting edge being arranged approximately in the middle region of each chain link and extending transverse to the running direction of the chain die assembly, and consequently, transverse to the vertical longitudinal center plane. A quarter of a hollow impression connects to the cutting edge of each chain link to the front and to the rear. Four of these quarter impressions define the cross section of the die chamber, each of these cross sections of a die chamber being formed by two adjacent chain links of the upper chain and two adjacent chain links of the lower chain. Guiding housings are arranged right and left of the longitudinal center plane in a mirror-symmetric design and arrangement. The guiding housings have a substantially U-shape design. A die is movably guided in each guiding housing right and left of the common longitudinal center plane of the chain die assembly. The dies are arranged to be movable in a perpendicular direction with respect to the vertical longitudinal center plane. Each die includes a shank being movably supported in two legs of the corresponding guiding housing having corresponding openings. Die heads are formed at the ends of the die facing in an inward direction. The die heads in combination with the chain links limit the corresponding die chamber. Rollers are arranged at the ends of each shank of each die facing in an outward direction such that the axial movement of the die into the closed position is realized by guiding bars being located at the die apparatus. The dies are actuated under prevailing roll friction. Protrusions extending in a radial direction are anchored in the shanks of the dies. The protrusions cooperate with other guiding bars under prevailing sliding friction to open the die chamber. Each guiding housing of the upper chain is pivotally connected to the chain links by two adjacent shafts. There also is a pivotal connection between the shaft and the guiding housing. Finally, each guiding housing is pivotally connected to the chain link by an adjacent shaft. Such an upper chain includes a number of chain links to which the same number of shafts and twice the number of guiding housings and twice the number of dies are allocated. Due to the great number of pivotal connections, the dies are guided with a comparatively great backlash. The backlash of each of the pivotal connections adds up to a certain total backlash. The first backlash, clearance or play is determined by a pivotal connection between the shank of the die and the guiding housing. In addition, there is the backlash between the guiding housing and the shaft. The third backlash is defined by the pivotal connection between the shaft and the chain link. Consequently, the dies with their axes are supported and movable with respect to the die chambers only with a limited precision. The limited precision and exactness results in the candy mass and the finished product being squeezed. Additionally, there is wear and tear due to the great number of pivotal connections during the rotation of the chain die assembly. The wear and tear has a negative effect on the exactness of the guidance and on the support of the dies. Such a chain die assembly has a certain limited durability or lifetime. When the wear and tear does exceed a certain value, the dimensional accuracy of the candy to be produced decreases, and the portions of the candy that are squeezed are increased to reach an extent which is no longer tolerable. The above described disadvantageous backlash in the prior art not only relates to the support and the guiding of the dies with respect to one another, but additionally, it relates to the pivotal arrangement of the chain links. Each chain link is pivotally supported at two adjacent shafts by a total number of four joints. As with all pivotal connections, the joints require backlash being increased by wear and tear. These numerous but necessary backlashes have a negative effect on the preciseness of the die operation, they result in wear and tear occurring at each pivotal connection, and they reduce the output of the chain die assembly and its lifetime. The above described wear and tear is especially important since the above described pivotal connections are designed as joints being subject to sliding friction without lubricant being used. Additionally, during production powdery sugar components cannot be prevented from entering between the surfaces. Consequently, the powdery sugar components have a substantial abrasive effect also decreasing the durability of the chain die assembly. The known chain die assembly has a strongly limited durability and lifetime, and it may only be operated at a strongly limited velocity with which the chain die assembly circulates. Thus, the power and the output of such a known die apparatus is strongly limited.

It is also known in the art to reduce the number of guiding housings compared to the number of chain links and to the number of shafts by 50 percent such that two adjacent shafts engage one and the same guiding housing. In other words, each guiding housing carries two dies. Consequently, the total number of pivotal connections is reduced. Nevertheless, the reduction does not have an influence on the exactness of the guidance of the dies at the die chambers since the two dies being arranged at one guiding housing work in two adjacent and separate die chambers. The exactness of the reproducibility with which candy is produced is not improved. The great number of joints results in the negative effect of the chain die assembly being lengthened during operation.

SUMMARY OF THE INVENTION

Briefly described, the present invention provides a chain die assembly for producing candy. More particularly, the present invention provides a chain die assembly for producing candy including a plurality of first chain links each including a cutting edge, a plurality of second chain links each including a cutting edge and a common longitudinal center plane. A plurality of guiding housings is arranged right and left of the longitudinal center plane, and they each carry at least one die. A plurality of shafts each connects one of the first chain links to one of the second chain links and to the guiding housings. The second chain links each are fixedly connected to at least one of the guiding housings to be free from backlash and to be unrotatable with respect to the guiding housing.

The present invention is based on the concept of reducing the number of pivotal connections in the chain die assembly to reduce wear and tear, and to improve the exactness with which candy is produced. At least every other chain link and a corresponding shaft and a corresponding guiding housing together form a fixed unit being free from backlash. The above mentioned elements are not pivotable with respect to one another. The above mentioned elements form a unit which only moves with respect to other parts not being part of the fixed unit. The elements may also be made of one piece. For reasons of an easier production and an improved mountability and demountability, the chain link, the corresponding shaft and the corresponding guiding housing are mounted in a way that there is no friction and no wear and tear between these elements. In the prior art chain die assemblies, a first pivotal connection is arranged between the chain link and the shaft, and a second pivotal connection is arranged between the shaft and the guiding housing. The novel chain die assembly does not include these two pivotal connections. The dies still have to be movably guided in the guiding housings. The dies are guided with respect to the chain links with a substantially increased exactness since the novel chain die assembly does not include the above described two pivotal connections. The candy is prevented from being squeezed. The candies attain the desired dimensions. The durability and the lifetime of the chain die assembly is increased due to the reduction of joints including backlash. The wear and tear is reduced. This also results in noise being reduced during production. With the novel chain die assembly, it is possible to attain working velocities of the chain die assembly up to approximately 200 meters per minute. The limit for the working velocity of the chain die assembly has been approximately 100 to 120 meters per minute in the prior art. Another advantage of the novel chain die assembly compared to chain die assemblies known in the prior art is that it is not necessary to arrange distance sleeves between the chain links having the outward cheeks and the guiding housing. The reason for this fact is that the above mentioned elements are combined to form one fixed unit.

With this arrangement, not only the weight of the assembly is reduced, but the chain die assembly also has a very compact design. The present invention is also applicable to chain die assemblies in which the number of guiding housings is twice as great as the number of chain links. This means that one die is slidingly and movably supported in one guiding housing. The present invention is also applicable to chain die assemblies in which the number of guiding housings and the number of chain links is identical. Such an arrangement means that two dies of adjacent die chambers are movably supported in one common guiding housing. The arrangement of the two dies of one die chamber right and left of the vertical longitudinal center plane of the chain die assembly with respect to one another is improved due to the combination of the above mentioned elements as one fixed unit. The chain links having outward cheeks are not movable with respect to the shafts. Only the chain links having inward cheeks are pivotable with respect to the shafts. It is to be understood that the angles to be pivoted through and the relative movement is increased during the deflection of the chain die assembly. Nevertheless, wear and tear does not increase proportionally with respect to this angle. In the first place it is the break away force in the pivotal connections to be overcome during each deflection that has a negative effect on the output and that increases friction.

It is especially preferred if the two guiding housings right and left of the common longitudinal center plane of the chain links are fixedly connected with one another by a corresponding shaft. In this way, a unit being stiff in a transverse direction with respect to the longitudinal center plane is provided. The unit continuously extends over the width of the chain die assembly such that a symmetric design with respect to the longitudinal center plane is achieved. It is known in the prior art to use shafts which are produced without a determined permissible variation or tolerance. Such a tolerance is not necessary to form the numerous joints. It is clear that different backlashes result in the joints in the prior art. These backlashes in the prior art have a negative effect on the output and the power of the chain die assembly, and they reduce the durability and the lifetime of the chain die assembly. The novel chain die assembly cooperates with shafts the diameter of which has been produced with a predetermined certain permissible variation or tolerance. These allowable tolerances are determined in coordination with the bores being located in the chain links and in the guiding housings.

In an especially preferred embodiment of the present invention every other chain link is connected to two corresponding shafts and to one common guiding housing carrying two dies to form a fixed unit being free from backlash. The guiding housings are flanged to the cheeks of the chain links having outward cheeks. The two guiding housings right and left of the longitudinal center plane each serve to support two dies. They are interconnected by two shafts to be adjusted with respect to one another. The above described preferred arrangement improves the exactness of the die process and consequently the dimensional accuracy of the candy.

There is a number of possibilities for the assembly of the above mentioned elements to form a fixed unit being free from backlash. It is especially easy to realize such a combination of the elements by connecting the chain link, the shafts and the guiding housing to form an unmovable but demountable unit by using interference fits or press fits. The fixed and unmovable unit has to be detachable, for example, to assemble and to disassemble the chain die assembly. It may be also necessary to replace certain elements. In case of an arrangement using interference fits, the outer diameter of the shafts are overmeasured compared to the diameter of the bores in the elements to be combined to form a fixed unit. It is possible to assemble the elements by applying pressure in a direction perpendicular to the vertical longitudinal center plane.

Another advantageous embodiment of the present invention is an arrangement in which the guiding housing, on the one hand, and the chain link, on the other hand, each include two bores being located on both sides right and left of the common longitudinal center plane. Two adjacent shafts extend through the bores. The axes of the two bores being located in the chain link are displaced with respect to the axes of the two bores being located in the guiding housing in a way that friction occurs during assembly of the unit. This is true for each side right and left of the longitudinal center plane. With this arrangement, the two shafts being located in the bores of the guiding housing and in the bores of the chain links having the outward cheeks are clamped with respect to one another. The attainable frictional connection securing the fixed unit depends on to what extent the axes are dislocated with respect to one another. In this embodiment of the present invention, the guiding housing and the chain link on both sides right and left of the common longitudinal center plane may each be connected to an additional screw. These screws have several functions. They serve to facilitate the assembly of the elements by the guiding housing approaching the outward cheeks due to the screw. This is especially advantageous in the last portion of the movement during which the dislocation of the axes resulting in frictional engagement makes it hard to overcome the clamping force. Additionally, the screw secures the flange connection between the guiding housing and the outward cheek of the corresponding chain link such that the guiding housing cannot move with respect to the shaft in an outward direction, even during operation of the chain die assembly and occurring vibrations and impact shocks.

Only the chain links having outward cheeks are connected to the guiding housings and to the two shafts in a way to form a fixed unit. The chain links having inward cheeks are movable with respect to the shafts. This means that these chain links are pivotally connected to the shafts. In this way, two adjacent chain links as seen in the direction of main extension of the chain die assembly are movable with respect to one another, as it is required for a chain. Only one kind of chain links is pivotally connected to a shaft, whereas it is known in the prior art to pivotally connect all chain links with respect to the shaft.

It is possible to design the one kind of chain links in a way that they have inward cheeks being wider than the outward cheeks of the other kind of chain links. Since the pivotal connection is only realized for one kind of chain links having inward cheeks, the width of the cheeks may be increased to reduce the surface pressure. Such a design also has a positive effect on the durability of the chain die assembly. The one kind of chain links having inward cheeks is pivotally connected to two adjacent shafts.

It is further possible that the two adjacent shafts, in addition to their pivotal connection by the one kind of chain links, are connected to the inward cheeks by joint bars. The joint bars are arranged parallel to the chain links having inward cheeks and in the outer region of the guiding housing. Such an arrangement is especially advantageous to increase the lifetime and the durability of the chain die assembly. The joint bars are an addition to the one kind of chain links having inward cheeks in a way that the adjacent guiding housings right and left of the longitudinal center plane are pivotally connected on a broad basis.

Other features and advantages of the present invention will become apparent to one with skill in the art upon examination of the following drawings and the detailed description. It is intended that all such additional features and advantages be included herein within the scope of the present invention, as defined by the claims.

BRIEF DESCRIPTION OF THE DRAWINGS

The invention can be better understood with reference to the following drawings. The components in the drawings are not necessarily to scale, emphasis instead being placed upon clearly illustrating the principles of the present invention. In the drawings, like reference numerals designate corresponding parts throughout the several views.

DETAILED DESCRIPTION

Figure 1:
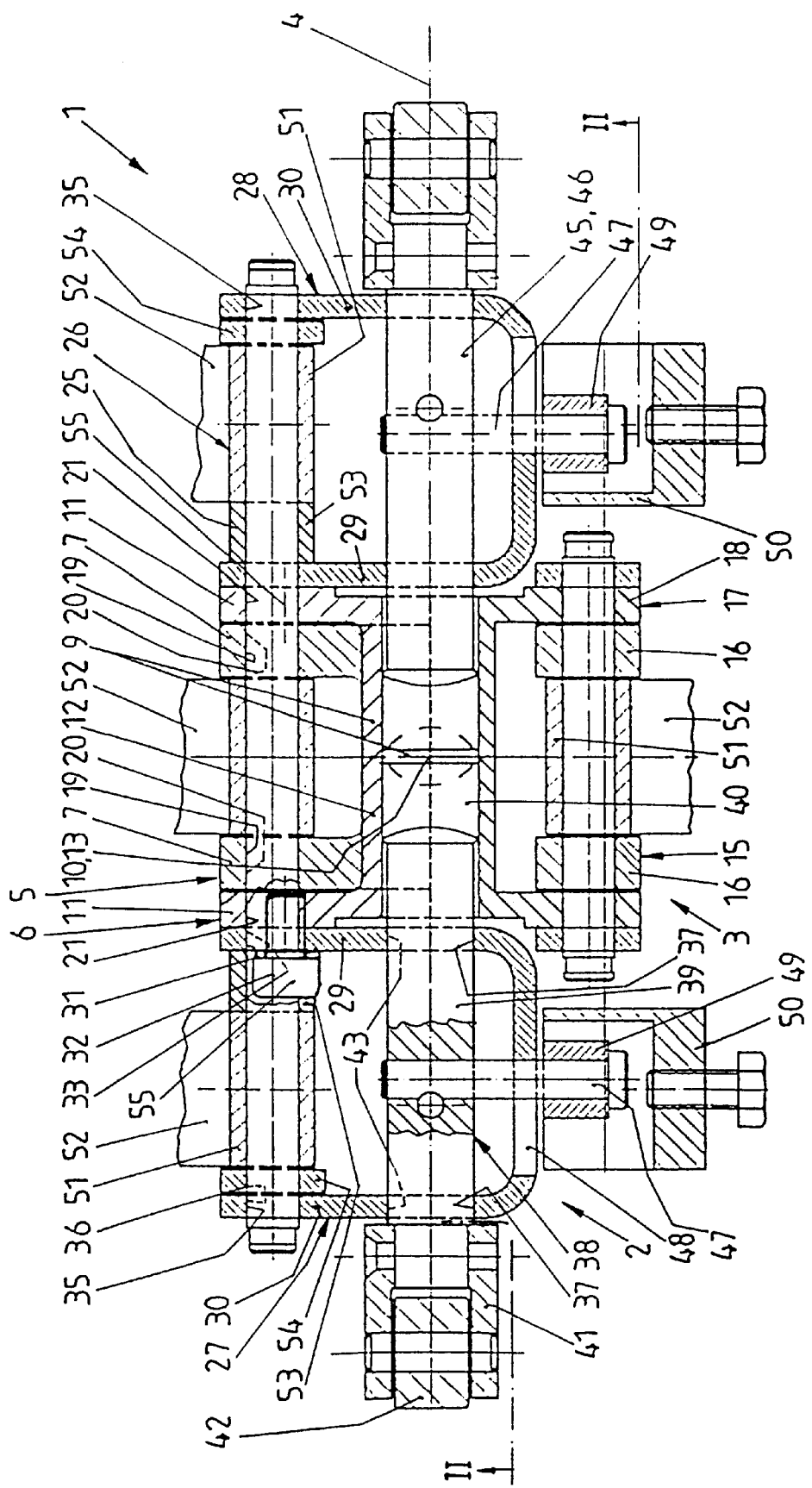
FIG. 1 is a vertical sectional view through the essential elements of the chain die assembly.

Referring now in greater detail to the drawings, FIG. 1 illustrates the essential elements of a chain die assembly 1 which are necessary to understand the present invention. As generally known in the art, the chain die assembly 1 includes an upper chain 2 and a lower chain 3 correspondingly working together. The upper chain 2 and the lower chain 3 work together in a horizontal plane 4 extending perpendicular to the plane of illustration of FIG. 1. Usually, the upper chain 2 is arranged above the horizontal plane 4. Nevertheless, some portions of the upper chain 2 are arranged below the horizontal plane 4. The lower chain 3 is arranged totally below the horizontal plane 4. It is to be understood that an inverse arrangement of the upper chain 2 and of the lower chain 3 is also possible. The upper chain 2 and the lower chain 3 are each designed as endless chains, and they are driven by operatively connected driving wheels. Additionally, they are guided by deflector wheels (not illustrated). The chain die assembly 1 with its upper chain 2 and its lower chain 3 circulates in a direction perpendicular to the plane of illustration of FIG. 1.

The invention is applied to the upper chain 2, whereas the lower chain 3 is only illustrated for reasons of better understanding the general arrangement. Nevertheless, an inverse arrangement and an arrangement in which the invention is applied to both chains 2, 3 is also possible. The upper chain 2 includes chain links 5 and 6. The chain links 5 and 6 are alternately arranged along the length of the upper chain 2. The chain links 5 each include two inward directed cheeks 7. Each chain link 5 with its inward directing cheeks 7 is arranged to be mirror-symmetric to a vertical longitudinal center plane 8 of the chain die assembly 1. The two inward directed cheeks 7 of each chain link 5 are interconnected by a protrusion 9 including a cutting edge 10 extending into the horizontal plane 4.

Figure 3:
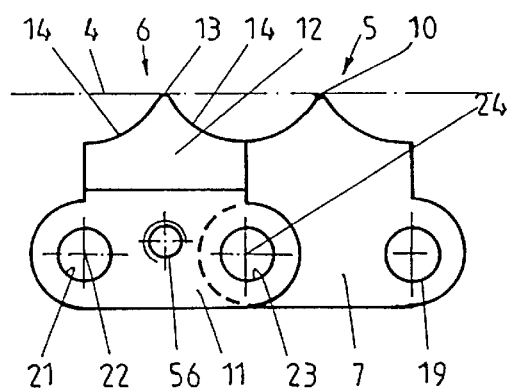
FIG. 3 is a side view of a chain link having outwardly directed cheeks.

Each chain link 6 includes two outward cheeks 11. The cheeks 11 are also designed and arranged to be symmetric with respect to the longitudinal center plane 8. The outward cheeks 11 are also interconnected by a protrusion 12 (FIG. 3) in a bridge-like design. The protrusion 12 ends in a cutting edge 13 in the horizontal plane 4. A quarter circumferential surface 14 is formed right and left of each cutting edge 13 of each chain link 6. The two quarter circumferential surfaces 14 being illustrated in FIG. 3 are part of adjacent die chambers. This means that they are part of different die chambers. The chain links 5 including the inward cheeks 7 have the same outline as the chain links 6 having the outward cheeks 11 (FIG. 3). Consequently, corresponding quarter circumference surfaces are arranged next to the cutting edge 10. The lower chain 3 includes chain links 15 having inward cheeks 16. Correspondingly, the lower chain 3 also includes chain links 17 including outward cheeks 18. The chain links 15 and 17 have a similar design as the chain links 5 and 6 of the upper chain. This means that they include protrusions ending in the corresponding cutting edges. Quarter circumference surfaces are arranged right and left of the protrusions. It is easy to imagine that a die chamber for the production of candy is formed by the circumference of the four quarter circumference surfaces 14 of two adjacent chain links 5, 6 of the upper chain 2 and by two adjacent chain links 15 and 17 of the lower chain 3. In other words, a die chamber is formed by four quarter circumference surfaces of four different chain links 5, 6, 15, 17.

The chain links 5 and 6 with their cheeks 7 and 11 cover one another. Two bores 19 are located in the inward cheeks 7 of the chain links 5 to be symmetric to the longitudinal center plane 8 and to be axially aligned. Each chain link 5 includes two further bores 20 at the inward cheeks 7. The bores 20 have a dislocated axis. The outward cheeks 11 of the chain links 6 have a corresponding design, and they include four bores. Two bores 21 are aligned with a common axis 22. Two further bores 23 are arranged with axes 24 being aligned with respect to one another, but being dislocated with respect to the axes 22 (FIG. 3). The chain links 5 and 6 are alternately brought into a relative position such that the axis 22 of the bores 21 is aligned to the axis of the bore 19 in the inward cheeks 7 of the chain link 5. A common continuous shaft 25 extends through the bores 19 and 21 of the cheeks 7, 11 of the chain links 5 and 6. A second shaft 26 extends parallel to the first shaft 25. The shaft 26 extends through the bores 20 and 23 of the chain links 5 and 6. The adjacent shafts 25 and 26 extend through the bores 21 and 23 of one single chain link 6 having outward cheeks 11, and through the bores 19 and 20 of two different chain links 5.

The two adjacent shafts 25 and 26 extend to both sides of the vertical longitudinal center plane 8 in an outward direction. A guiding housing 27 is arranged on one side of the longitudinal center plane 8, and another guiding housing 28 is arranged on the other side of the longitudinal center plane 8. The guiding housings 27 and 28 have an approximately U-shaped cross section, and they each include inward legs 29 and outward legs 30. A bore 31 is arranged in each inward leg 29. The bores 31 have a common axis 32 being in alignment. Similar to the chain links 5 and 6, the inward legs 29 each include another bore 33 having a common axis 34. The outward legs 30 also include bores 35 and 36 being dislocated with respect to one another. The bores 35 are aligned to the bores 31. The bores 36 are aligned to the bores 33. The shaft 25 extends through the bores 19, 21, 31, 35. The shaft 26 extends through the bores 20, 23, 33, 36. The two guiding housings 27 and 28 are fixedly and unmovably connected to the chain links 6 by the two shafts 25 and 26, whereas the two chain links 5 adjacent to the chain link 6 are pivotable with respect to the shaft 25 and 26, respectively. Each chain link 6 of the chain die assembly 1 and of the upper chain 2, respectively, together with two guiding housings 27 and 28 and two shafts 25 and 26 forms a fixed unit. The elements of the fixed unit are not movable with respect to one another, and they are especially not pivotable. The assembly of a chain link 6, two shafts 25 and 26 and two guiding housings 27 and 28 to form a fixed and unmovable unit may be realized in different ways, as this will be explained hereinbelow. The fixed connection between the inward leg 29 of each guiding housing 27 and 28, respectively, and the outward cheeks 11 of the corresponding chain link 6 may be secured by a screw 55. The screw 55 extends through the corresponding inward leg 29, and it engages a thread 56 (FIG. 3) in the outward cheek 11 of the chain link 6.

The guiding housing 27 includes two bores 37, one of the bores 37 being located in the inward leg 29, and the other bore 37 being located in the outward leg 30. The two bores 37 of the guiding housing 27 are aligned with respect to one another. The two bores 37 form a slip guide for a die 38. The die 38 includes a shank 39 and a die head 40 forming the end of the die 38 facing the longitudinal center plane 8. A fork eye 41 is arranged at the end of the shank 39 of the die 38 extending toward the outside. A roller 42 is rotatably supported in the fork eye 41. Two further bores 43 are located parallel to the axis of but displaced to the bores 37. The bores 43 also have an aligned axis at the guiding housing 27. The two bores 43 serve to support another die 44 in the sense of a sliding and guiding support. Thus, two dies 38 and 44 are supported at and in, respectively, the guiding housing 27. The two dies 38 and 44 are arranged to be parallel with respect to one another, and they substantially have the same design. Both dies 38 and 44 include a shank, a die head, a fork eye and a roller, as this has been described above with respect to the die 38. The guiding housing 28 has a mirror-symmetric design. It supports two further dies 45 and 46. The dies 45 and 46 are movable with respect to the vertical longitudinal center plane 8.

A transverse pin 47 is arranged in each shank 39 of each die 38, 44, 45, 46. The transverse pin 47 extends toward the outside through an elongated slot 48, and it carries a roller 49. The rollers 49 cooperate with guiding bars 50 having an inclined arrangement. The rollers 49 with the transverse pins 47 serve to open the dies 38, 44, 45, 46 during the circular movement of the chain die assembly 1. The rollers 42 at the dies 38, 44, 45, 46 cooperate in the sense of a closing movement of the die chambers. Guiding bars (not illustrated) are provided to ensure the closing movement of two cooperating dies 38 and 45 and 44 and 46, respectively. It is to be understood that the dies 38, 44, 45, 46 being located in the corresponding guiding housings 27 and 28 are arranged to be movable. The resulting backlash for movement in the bores 37 and 43, respectively, is the only backlash within the fixed unit including the chain die 6, the shafts 25 and 26, the guiding housings 27 and 28 and the dies 38, 44, 45, 46. Only the other kind of chain dies 5 having the inward cheeks 7 are supported on the shafts to be movable. A first chain link 5 is pivotable about the shaft 25. A further chain link 5 is pivotable about the shaft 26. The above described embodiment is characterized by two dies 38 and 44 being movably supported and combined, respectively, at each guiding housing 27. The dies 38 and 44 are allocated to two adjacent die chambers partly being formed by one single chain die 6. The same is true for the guiding housing 28 and so forth. The number of guiding housings corresponds to the number of chain links. Nevertheless, the invention is also applicable to guiding housings in which only one die is slidingly and movably supported.

Roller sleeves 51 are arranged on the shafts 25 and 26. One roller sleeve 51 is arranged in the region of each guiding housing 27 and 28. Another roller sleeve 51 is located between the inward cheeks 7 of each chain link 5. The roller sleeves 51 cooperate with pressure strips 52 only schematically being illustrated in FIG. 1. The roller sleeves 51 may be fixedly arranged in the axial direction by distance sleeves 53. There may be joint bars 54 in the outer region of the guiding housings 27 and 28. The joint bars 54 connect the shafts 25 and 26 of adjacent guiding housings 27 and guiding housings 28.

The number of joints is substantially reduced with the novel chain die assembly 1. Thus, a reliable basis for a guidance of the dies 38, 44, 45, 46 is realized by the chain link 6, the two shafts 25 and 26 and the two guiding housings 27 and 28 forming a fixed and stiff unit. The dies with their die heads 40 are guided more exact with respect to one another and with respect to the quarter circumference surfaces 14 at the chain links 6 and 5 than it is known in the prior art. The only movable location is the sliding guidance of the dies in the guiding housings and the joint between the chain links 5 at the shafts 25 and 26. Consequently, wear and tear is substantially reduced. The chain die assembly 1 has an advantageously improved durability and action time. The die apparatus using the chain die assembly 1 has an improved output since the velocity of the drive of the chain die assembly 1 may be increased.

Figure 2:
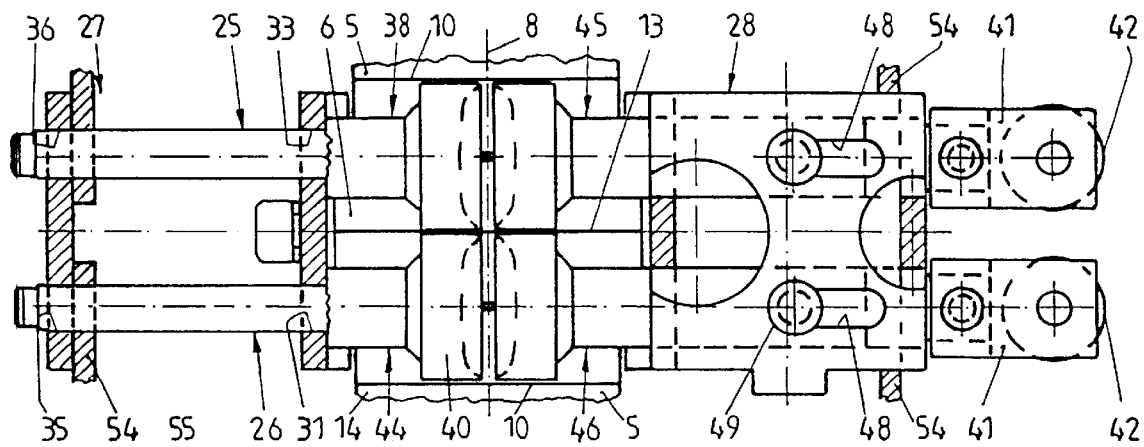
FIG. 2 is a partially sectional view of the upper chain as seen from below.

It is to be seen from FIG. 2 that the two guiding housings 27 and 28 being allocated to one common chain link 6 having outward cheeks 11 are interconnected by two shafts 25 and 26 to form a fixed unit. A fixed unit means that the components of the unit cannot be moved with respect to one another, especially they cannot be pivoted with respect to one another. Two dies 38 and 44 are guided in the guiding housing 27 to be movable. Two dies 45 and 46 are movably supported in the guiding housing 28. The dies 38 and 45 in combination with the quarter circumference surfaces 14 of adjacent chain links 6 and 5 of the upper chain 2 and 15, 17 of the lower chain 3 limit a die chamber in which one candy is formed.

FIG. 3 illustrates a side view of a chain link 6 having outward cheeks 11 and one of the two chain links 5 having inward cheeks 7 being located right and left of the chain link 6. The chain links 15 and 17 of the lower chain 3 (not illustrated) extend symmetric with respect to the horizontal plane 4. The cutting edges of the chain links of the upper chain and of the lower chain contact in the closing position of the die chamber.

To produce and to assemble fixed units including elements not being movable with respect to one another according to the present invention, there are different possibilities to one with skill in the art. There are possibilities of producing different elements from one piece of material, for example the chain links 6 and the guiding housings 27 and 28. The possibility of a one-piece production is usually limited by the necessity of assembly and disassembly of the upper chain. It may be also necessary to be able to open the upper chain 2. A preferred design and arrangement of the fixed unit including the chain link 6, corresponding shafts 25 and 26 and corresponding guiding housings 27 and 28 is explained in greater detail with respect to FIG. 4.

Figure 4:
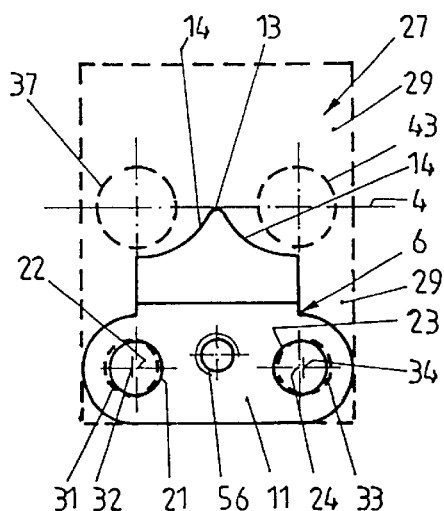
FIG. 4 is a view of the chain link and the guiding housing.

FIG. 4 illustrates the side view of the chain link 6 having outward cheeks 11 by a continuous line, as this has already been illustrated in FIG. 3. The guiding housing 27 is illustrated by a dotted line. The outward cheek 11 includes the bore 21 with its axis 22 and the bore 23 with its axis 24. The bore 31 with its axis 32 and the bore 33 with its axis 34 are arranged in the inward leg 29 of the guiding housing 27. The axis 32 is slightly dislocated to one side with respect to the axis 22. The axis 24 is slightly dislocated to the other side with respect to the axis 34 (exaggerated illustration). When the two shafts 25 and 26 are inserted from the one side, there is a tension in the region of the bores and a tension between the guiding housing 27 and the chain link 6. Similar is true to the guiding housing 28 being located on the other side of the longitudinal center plane 8. The natural flexibility of the shafts 25 and 26 makes it possible to assemble the chain die assembly 1. Consequently, at the beginning it is easy to insert the shafts 25 and 26. Later, closer to the ending of the insertion movement, it is necessary to apply substantial force since friction increases and the inward leg 29 finally gets in contact to the outward cheek 11. For this purpose, it makes sense to use the screw 55 to provide the force by screwing the screw into the thread 56. It is to be understood that the two guiding housings 27 and 28 are moved upon the shafts 25 and 26 from different sides not to damage the pivotable joint existing between the shafts 25 and 26 and the corresponding chain links 5.

Many variations and modifications may be made to the preferred embodiments of the invention without departing substantially from the spirit and principles of the invention. All such modifications and variations are intended to be included herein within the scope of the present invention, as defined by the following claims.

We claim:

1. A chain die assembly for producing candy, comprising:
 a plurality of first chain links each including a cutting edge;
 a plurality of second chain links each including a cutting edge;
 a common longitudinal center plane;
 a plurality of guiding housings being arranged right and left of the longitudinal center plane and each carrying at least one die; and
 a plurality of shafts each connecting one of said first chain links to one of said second chain links and to said guiding housings, said second chain links each being fixedly connected to at least one of said guiding housings to be free from backlash and to be unrotatable with respect to said guiding housing.

2. The assembly of claim 1, wherein two of said guiding housings are fixedly connected to each other by one of said shafts.

3. The assembly of claim 1, wherein each of said second chain links is fixedly connected to two of said shafts and to one common guiding housing carrying two dies to form a fixed unit being free from backlash.

4. The assembly of claim 2, wherein each of said second chain links is fixedly connected to two of said shafts and to one common guiding housing carrying two dies to form a fixed unit being free from backlash.

5. The assembly of claim 3, wherein said fixed unit including said second chain link, said shafts and said guiding housing is realized by interference fits to be unmovable but detachable.

6. The assembly of claim 4, wherein said fixed unit including said second chain link, said shafts and said guiding housings is realized by interference fits to be unmovable but detachable.

7. The assembly of claim 5, wherein said guiding housing and said second chain link each include bores each having an axis and being located on both sides right and left of the common longitudinal center plane, wherein two adjacent shafts each extend through said bores, wherein at each side right and left of the common longitudinal center plane the axes of said bores being located in said second chain link are offset with respect to the axes being located in said guiding housing in a way that frictional engagement is realized.

8. The assembly of claim 6, wherein said guiding housings and said second chain link each include bores each having an axis and being located on both sides right and left of the common longitudinal center plane, wherein two adjacent shafts each extend through said bores, wherein at each side right and left of the common longitudinal center plane the axes of said bores being located in said second chain link are offset with respect to the axes being located in said guiding housings in a way that frictional engagement is realized.

9. The assembly of claim 7, wherein said guiding housing and said second chain link at both sides of the common longitudinal center plane are each connected by an additional screw.

10. The assembly of claim 8, wherein said guiding housings and said second chain link at both sides of the common longitudinal center plane are each connected by an additional screw.

11. The assembly of claim 3, wherein only said second chain links are connected to said guiding housing and to said two shafts to form said fixed unit.

12. The assembly of claim 4, wherein only said second chain links are connected to said guiding housings and to said two shafts to form said fixed unit.

13. The assembly of claim 1, wherein said first chain links and said second chain links each include cheeks, said cheeks of said first chain links being wider than said cheeks of said second chain links.

14. The assembly of claim 1, wherein said first chain links each are rotatably connected to two adjacent shafts.

15. The assembly of claim 14, wherein said two adjacent shafts are interconnected by said first chain link and by joint bars being arranged in the outer region of said guiding houses and parallel to said first chain link.

* * * * *